Jan. 22, 1963  E. S. CARPENTER ETAL  3,074,117
METHOD FOR MAKING METAL REINFORCED PLASTIC ARTICLES
Filed Dec. 7, 1959  5 Sheets-Sheet 3

INVENTORS
EARL S. CARPENTER
HOWARD E. CHACE
BY CHESTER B. DERR

Louis L. Laguna
ATTORNEY

3,074,117
METHOD FOR MAKING METAL REINFORCED
PLASTIC ARTICLES
Earl S. Carpenter and Howard E. Chace, Southbridge, Mass., and Chester B. Derr, South Woodstock, Conn., assignors to American Optical Company, Southbridge, Mass., a voluntary association of Massachusetts
Filed Dec. 7, 1959, Ser. No. 857,966
1 Claim. (Cl. 18—59)

This invention relates to improved method for inserting metal parts into articles of non-metallic material and has particular reference to the making of non-metallic spectacle temples having bendable metallic core parts.

In the manufacture of plastic articles such as spectacle temples or the like, it has long been the practice to place a bendable metallic core within the plastic throughout the major portion of its length to lend stability to the finished temple and permit it to be adjusted to normal head-fitting shapes without fracturing at the more severe bends, particularly adjacent the ear section. However, in the manufacture of such spectacle temples in particular, the task of obtaining an accurate centering of the temple core in the plastic material has, heretofore, been difficult to perform consistenly and economically.

For example, wire core spectacle temples have been constructed by various laminating or molding techniques wherein the core parts are either sandwiched between sheet-like pieces of plastic temple blank material with heat and pressure or placed in mold cavities and surrounded with a molten plastic which is injected under pressure into the cavities. Because of variations in temperature and/or densities throughout the heated plastic materials and the need for relatively high pressures in forming temples by both of the above techniques, considerable difficulty has been experienced in avoiding mis-alignment of the core parts by bending or slippage resulting from injection impact, premature solidification of the plastic, variations in densities throughout the plastic material and/or other causes occurring during the fabrication of the temples.

Bent or otherwise mis-aligned core parts in the temple blanks often become exposed or nearly exposed at one or more sides of the temples thereby rendering the temples inferior and unsuitable for use.

Another technique used in the fabrication of wire core plastic temples has been to insert the wire core endwise into a heat-softened temple blank. In this way, lateral forces on the core parts of the temples which result from laminating or injection impact or the like are avoided. On the other hand, however, varying densities and temperature gradients which have been unavoidable heretofore in the heated plastic of the blanks cause the material of the blanks to offer varying degrees of resistance to the end thrust of the metal cores as they are plunged therein with the result that the cores often tend to deviate from an intended axial course into the blanks and again become exposed or nearly exposed at one or more sides of the finished temple.

Other difficulties experienced heretofore relate more particularly to the entrapment of unsightly air or gas bubbles between the metal and plastic parts of the temples as a result of overheating of the plastic material and/or temperature differences between the core and plastic material at the time of insertion of the core. In addition to reducing the aesthetic value of transparent temples, air or gas bubbles cause corrosion and weakening of the reinforcing cores.

While various relatively complicated heating and cooling arrangements and procedures involving heating and chilling parts of the temple blanks have been used heretofore in an attempt to force a wire core into the temple blanks, all have, in one way or another, left much to be desired particularly in the forming of wire core plastic temples from blanks having irregularly shaped or designed outer contours.

A principal object of the present invention is to overcome the above-mentioned and other difficulties relating to the manufacture of plastic articles having wire or other metallic reinforcements therein by providing a novel method for rapidly, accurately, efficiently and controllably heating the articles of non-metallic materials and forcing the metallic reinforcing parts into said materials without causing appreciable deformation of said reinforcing parts or the entrapment of air or gases during the insertion thereof.

Another object is to provide in apparatus for heat-softening plastic articles, a novel method for uniformly heating said articles to a pre-controlled temperature only throughout a restricted predetermined section or area thereof into which metallic reinforcing members are to be inserted.

Another object is to provide a novel method for uniformly heat-softening the material of a plastic spectacle temple blank to a predetermined condition of viscosity throughout a restricted relatively narrow path extending longitudinally of the blank and having a cross-sectional area of precontrolled desired size and shape into which a wire reinforcing core part may be driven endwise without being subjected to lateral diversion or bending by the material of said blank.

Another object is to provide, in improved heating means of the above character, a novel method for producing a uniformly heated path or zone of controlled shape and size in the plastic part of an article of the above nature even in instances wherein said plastic part has portions of variable internal densities and/or irregular outer contour shapes.

Another object is to provide improved core-driving method for successfully inserting wire cores endwise substantially centrally without appreciable lateral deviation into sheet-like plastic material of relatively uniform internal densities or for inserting said cores with equal success into irregularly shaped articles such as spectacle temple blanks having variable internal stresses and/or variable densities resulting from forces applied thereto such as by prior blanking operations.

Another object is to provide in dielectric heating apparatus of the above character, a novel method for simultaneously applying high-frequency electrical energy of controlled different current densities or concentrations at opposite sides of an article of plastic dielectric material to be heated thereby so as to produce a uniformly heated area in said material of a predetermined desired cross-sectional shape controlled in accordance with the current concentrations of said electrical energy at the respective opposite sides of said article.

A further object is to provide a method of the above character by which relatively flammable materials such as nitrate plastics or the like can be safely heated to core-driving or other similar working temperatures without danger of incineration of said plastics.

A still further object is to provide methods which can be readily performed with apparatus which is relatively simple in construction and operation, and readily adaptable to the manufacture of wire core spectacle temples of all shapes and sizes and extremely safe in operation.

Other objects and advantages of the invention will become apparent from the following description when taken in conjunction with the accompanying drawings in which.

Referring more particularly to the drawings wherein like characters of reference designate like parts throughout the various views, there is shown more particularly in FIGS. 1–9 a preferred form of apparatus for carrying out the method of the invention which involves the heating of a plastic spectacle temple blank and inserting a metallic wire core endwise and centrally into the blank.

It is to be understood that any reference to the term "plastic material" used herein is intended to include any or all of the various known compositions such as acetates, butyrates, nitrates, vinyls or the like which are commonly used in the fabrication of spectacle parts or similar articles. It will, however, become apparent that, in accordance with this invention, the plastic materials are heated dielectrically and, therefore, must be of the dielectric type capable of readily converting high-frequency electrical energy into heat energy. That is, the amount of heat developed in a material is directly proportional to the amount of high-frequency power applied to it but, the voltage and frequency at which this power is applied depends on the form factor of the material and an electrical property known as "loss factor." Plastics such as mentioned above have high "loss factors" and are efficiently heated at moderate voltages and frequency whereas plastics such as polystyrene or Teflon or the like having low "loss factors" are impractical to heat dielectrically.

Figures 9, 10:
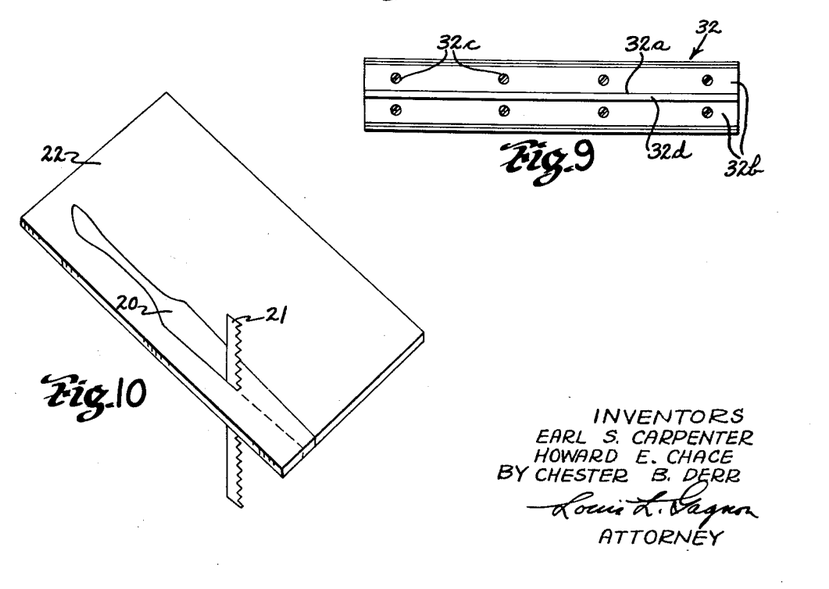
FIG. 9 is a top plan view of a second electrode assembly which is used as the grounded terminal of the above-mentioned dielectric heating system.
FIG. 10 is a diagrammatic illustration of one method by which spectacle temple blanks may be cut from plastic sheet stock.
Figure 11:
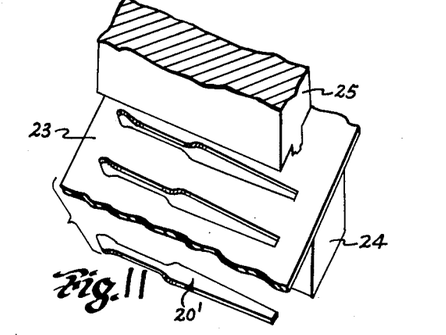
FIG. 11 is a diagrammatic illustration of another method which may be used to form similar spectacle temple blanks.

In FIGS. 10 and 11, there are diagrammatically illustrated two methods by which spectacle temple blanks 20 or 20' or like articles can be initially formed from plastic sheet stock to a desired size and shape. As shown in FIG. 10, one of these methods employs the use of a band or jig saw 21 by means of which the blank 20 is cut from a sheet 22 of plastic stock material having a thickness substantially equal to that desired of the finished temple. Another of these methods of forming temple blanks is shown in FIG. 11 wherein a sheet 23 of plastic stock material is directed over a die member 24 having a cavity therein shaped to the contour desired of the temple blanks 20'. The blanks 20' are punched or struck from the sheet stock 23 by a punch 25 in the usual manner.

While various other procedures such as casting, molding or blanking with cutting dies may be used to form temple blanks which are to be subsequently provided with wire cores, those given in FIGS. 10 and 11 have been chosen for purposes of illustration only because of the fact that blanks 20 formed by one method such as shown in FIG. 10, for example, will differ characteristically from blanks 20' formed by the method of FIG. 11 even though identical sheet stock materials are used in both cases. In this regard, it has been found that the material of a blank 20 which has been cut from sheet stock, as shown in FIG. 10, is substantially of uniform internal density and free of internal stresses or strains provided, of course, the sheet stock itself is initially so characterized. However, temple blanks 20' which are punched from sheet stock by blanking operations, such as shown in FIG. 11, inherently become slightly compacted adjacent their underside by the impact or force of the punch 25 and the material thereof becomes increasingly dense from top to bottom throughout the blanks 20'. The resistance of the material 23 to the shearing action of the punch and other similar effects are also believed to contribute to the above-mentioned compacting of the material of the blanks. Cast or injection molded temple blanks will fall under one or the other of the above-mentioned categories.

In view of the fact that slight alterations in the apparatus are necessary in order to carry out the present method of driving wire cores into temple blanks of uniform internal density as opposed to temple blanks of variable density, the apparatus of FIGS. 1–9 will first be described with relation to core-driving operations on blanks such as 20 having substantially uniform internal densities and later described with relation to core-driving operation on blanks such as 20' having variable internal densities.

Referring back to FIGS. 1–9, it will be seen that the apparatus embodies an elongated horizontal base section 26 having an enlarged head part 27 at one end thereof. Forwardly on the head 27, there is provided a vertical slideway 28 upon which is adjustably mounted, by conventional dovetailing arrangements or the like, an upper slide 29 and a lower slide 30 each adapted to be moved toward or away from the other. On the lower slide 30, there is provided a laterally and forwardly extending table 31 (see FIGS. 1, 2 and 3) having an elongated rectangularly-shaped electrode 32 dovetailed therein with its uppermost surface in substantially flush relation with the upper surface of the table 31. The electrode 32 provides the ground terminal of a dielectric heating system in the apparatus of the invention which is used to temperature-condition the temple blanks 20 for the reception of a wire core in a manner to be described in detail hereinafter. The electrode 32 embodies an elongated rectangular main body section having an upstanding relatively narrow ridged portion 32a on its upper side extending centrally across the length of the main body section (see FIGS. 3, 8 and 9). A pair of high-frequency electrical energy insulating strips 32b of Teflon material or the like are attached by screws 32c to the upper surface of the electrode 32, one at each side of the upstanding part 32a thereof and the insulating strips 32b are of controlled thickness such as to be substantially flush with the upper surface of the portion 32a and also with the upper surface of the table 31 thereby exposing only the upper face 32d of the portion 32a when the electrode is mounted in the table 31.

Figure 1:
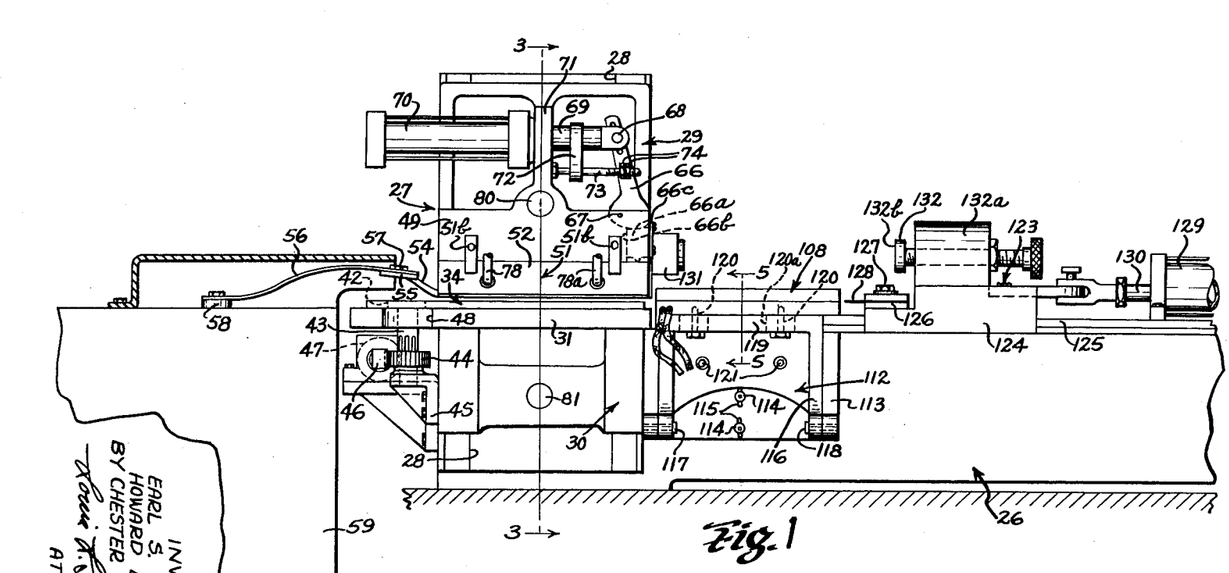
FIG. 1 is a front elevational view of apparatus for carrying out the method of the invention.
Figure 2:
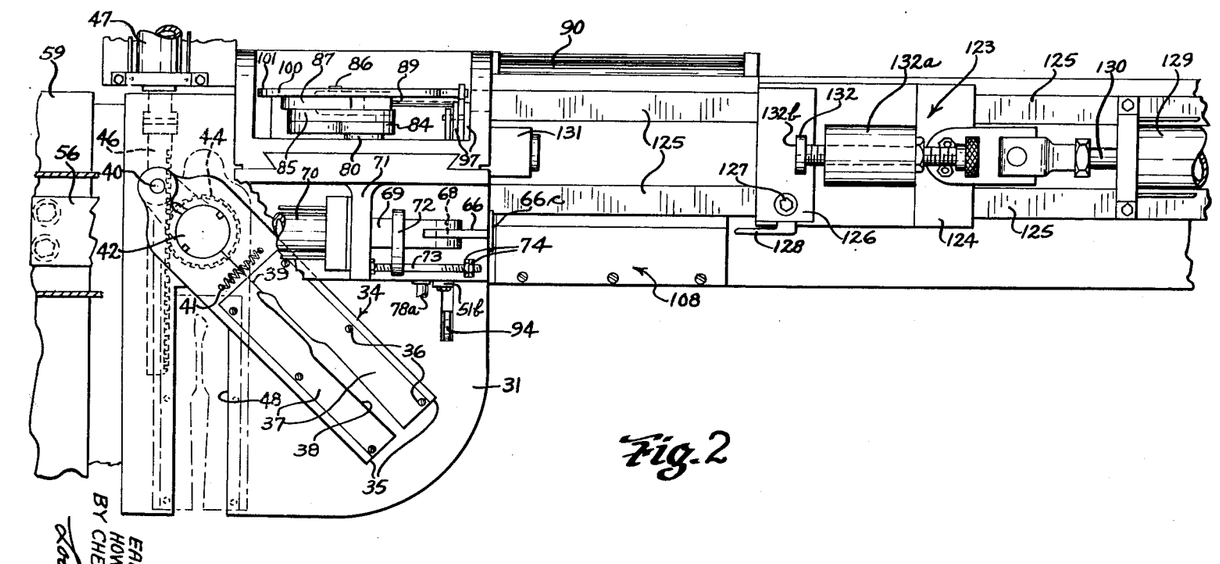
FIG. 2 is a top plan view of said apparatus.
Figure 3:
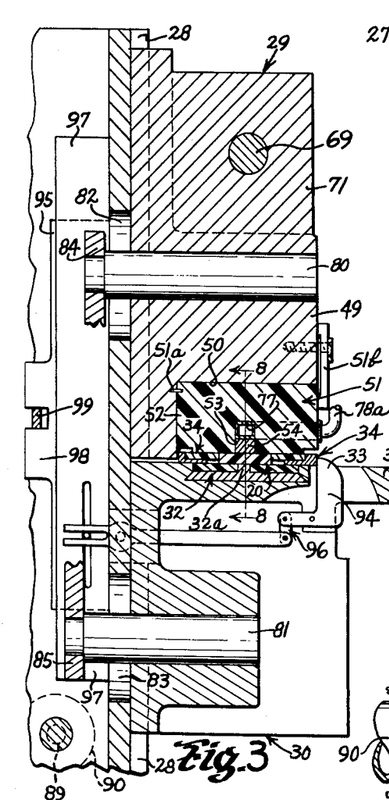
FIG. 3 is a vertical cross-sectional view taken on line 3—3 of FIG. 1 looking in the direction of the arrows.
Figure 4:
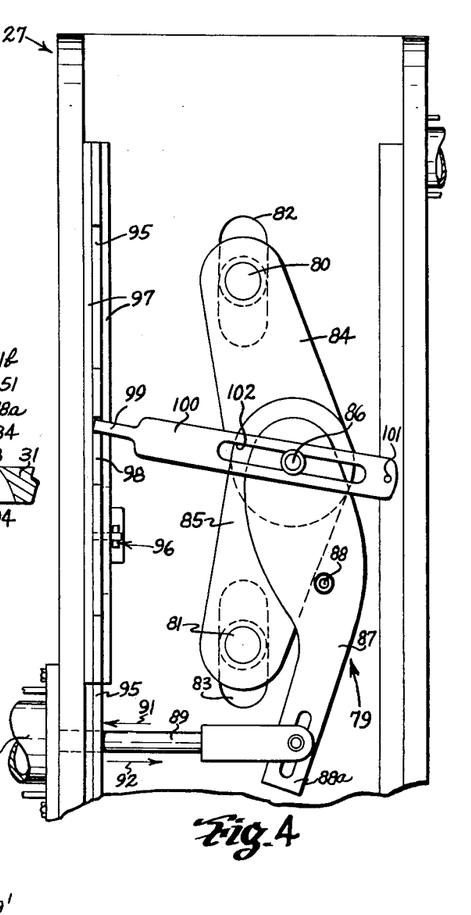
FIG. 4 is a fragmentary rear elevational view of the head portion of the apparatus shown in FIGS. 1, 2 and 3.

Also on the table 31, there is provided a pivotable template or nest 34 (see FIGS. 1, 2 and 3) in which the plastic temple blanks 20 are placed one at a time and automatically accurately positioned over the electrode 32 for heating by the above-mentioned dielectric system. The nest 34 which is elongated and rectangular in shape is of a thickness equal to or slightly less than that of a temple blank 20 and has a bifurcated frame-like section 35 in which is mounted by rivets or screws 36 a template 37 of non-dielectric material such as Teflon or the like. By non-dielectric material, it is meant a non-conductor or electrical insulator of the type having a so-called "low loss" factor and not capable, to any appreciable degree, of reacting to convert high-frequency electrical energy into heat. The template 37 is provided with a cut-out 38 contoured precisely to the shape of a temple blank 20 to be placed therein and in order to permit quick and easy insertion of a temple blank in the cut-out 38, the body part of the nest 34 is split at 39 and pivotally connected together at 40 with a tension spring 41 tending to urgently hold the two sections of the body part together. In this manner, one of the sections can be pulled slightly away from the other with one hand while the temple blank 20 is easily placed in the cut-out 38. Upon release of the particular section, the spring 41 will act to securely clamp the temple 20 in the cut-out 38. The nest 34 is fixed to an adaptor 42 which is keyed or similarly fastened to the upper end of an actuating shaft 43 (see FIG. 1) carried by the table 31 and extending downwardly therethrough into interfitting relation with a drive gear 44. The drive gear 44 is mounted on a stationary bracket 45 which is bolted or otherwise attached to the base 26 and the lowermost end of the shaft 43 is splined or otherwise similarly fitted into the gear 44 to permit vertical movement of the table 31 to take place without disengaging the driving relationship between the gear 44 and shaft 43. The gear 44 is actuated by a laterally extending rack 46 in mesh therewith which is driven by an air cylinder 47. Operation of the air cylinder 47 will then cause the nest to swing into position over the electrode 32, as shown in FIG. 3, or into a loading position, such as shown in FIG. 2, or into an unloading position, as shown by dot-dash lines also in FIG. 2. At the unloading position, the cut-out 38 of the nest 34 is positioned over an enlarged slot 48 in the table 31 permitting the temple blank 20 to drop downwardly out of the cut-out 38 and through the slot 48 in the table. In operation, the nest 34 is swung to the unloading position rapidly and stopped over the slot 48 so abruptly as to cause one of the split sections thereof to open momentarily against the action of the spring 41 and release the temple blank.

The upper slide 29 embodies a main body section 49 overhanging a substantial portion of the table 31 including the portion thereof in which the electrode 32 is positioned. Over the electrode 32, the section 49 of the upper slide 29 is cut away at 50 (see FIG. 3) for the reception of an elongated rectangularly-shaped upper electrode assembly 51 which is used to pass high-frequency electrical energy into a temple blank 20 placed in contact between it and the grounded lower electrode 32 thereby heating the material of the blank 20 in a manner to be described in more detail hereinafter.

The upper electrode assembly 51 embodies a main supporting section 52 (see FIGS. 1, 3, 6 and 7) formed of a non-dielectric material such as Teflon or the like having a rectangular slot 53 extending longitudinally and centrally across the bottom side thereof. In the slot 53, there is rigidly secured a tight-fitting rectangular rod-like electrical conductor 54 extending outwardly and away from the section 52 a short distance from one of its ends and terminating adjacent said end of the section 52 with an enlarged plate-like part 55 to which the high-frequency electrical current carrying conductor 56 of the conventional thin and wide sheet metal type is conducted by bolts or the like 57. The conductor 56 is, in turn, connected at its opposite end in a similar manner to the output terminals 58 of a conventional high-frequency electrical energy generator 59 (see FIGS. 1 and 2). Details of the generator 59 and its output characteristics will be set forth more specifically hereinafter when discussing the specific heating effects desired and accomplished in the material of the temple blanks by the apparatus of the invention.

The other end of the rod-like electrical conductor 54 is terminated adjacent the opposite end of the supporting section 52 and is pierced at 60 to permit the passage of a plunger 61 therethrough which is used to pinch-seal the end of a temple blank 20 into which a wire core has been driven. This operation will also be described in greater detail in a later discussion of the operation of the apparatus. However, it can be seen in FIG. 8 that the plunger 61 extends upwardly through the section 52 of the electrode assembly 51 into an enlarged circular cavity 62 and is provided with an enlarged head part 63 which is urged upwardly by a spring 64 and held in place by a retaining ring 65. In operation, the plunger 61 is depressed by an upwardly extending lever arm 66 pivotally mounted at 67 in the section 49 of the slide 29. The upper end of the arm 66 is attached by a swivel connection 68 to a horizontal push rod 69 which is operated by an air cylinder 70 fastened to an integral web part 71 of the slide 29. Actuation of the air cylinder 70 will cause the rod 69 to move horizontally and, through the connection 68, cause the arm 66 to pivot at 67 and depress a vertically slidable link 66a which is in end contact with the head 63 of the plunger 61. When the rod 69 is retracted by the air cylinder 70, the arm 66 will pivot away from the link 66a allowing the plunger 61 to retract under the influence of the spring 64 thereby pushing the link 66a upwardly. The link 66a is slidably fitted in a slotted portion 66b of the section 49 and held in place therein by a cover plate 66c. In order to control the extent to which the plunger 61 is permitted to press into the heated temple blank 20 when pinch-sealing the adjacent end thereof, the push rod 69 is provided with an integrally formed depending section 72 through which a guide rod 73 extends. The guide rod is disposed substantially parallel to the push rod 69 and is anchored at one of its ends to the web 71 and threaded adjacent its opposite end for the reception of adjustable stop nuts 74. Thus, when the push rod 69 is forced outwardly away from the air cylinder 70, the section 72 thereof will engage the stop nuts 74 and limit its throw in accordance with the adjusted position of the stop nuts 74 on the guide rod 73.

As a precaution against electrical arcing between the end of the electrode 51 having the plunger 61 therein and other adjacent parts of the apparatus, a plate 75 formed of a material similar to that of the main supporting section 52 is provided to cover said end of the electrode. The upper electrode further embodies a cooling system internally thereof to dissipate heat produced by conduction from the heated material of the temple blank. It should be understood that while no heat is generated by the electrical system itself, the heat produced in the material of the temple blanks by energy conversion is absorbed to some extent by the electrical-conducting rod 54 and more satisfactory results have been obtained by maintaining the upper electrode 51 at a relatively cool uniform temperature while the apparatus is in operation. The cooling of the electrode is accomplished by placing in a recessed section 76 (see FIG. 8) a tubular duct 77 having one side engaging the electrical-conducting rod 54. Inlet and outlet tubes 78 and 78a communicating with the duct 77 are extended laterally outwardly through the forward side of the main supporting section 52 and are connected to a suitable source (not shown) of circulating cool air or water. The use of air for cooling purposes is obviously preferred since water, being a relatively good conductor of electricity, might cause a short circuiting in the system should a leak occur in the cooling system.

The upper electrode assembly 51 is mounted on the section 49 of the upper slide 29 by means of locating pins 51a which fit into the section 49, as shown in FIG. 3, and a pair of clamps 51b are provided to hold the electrode assembly in place.

Figure 8:
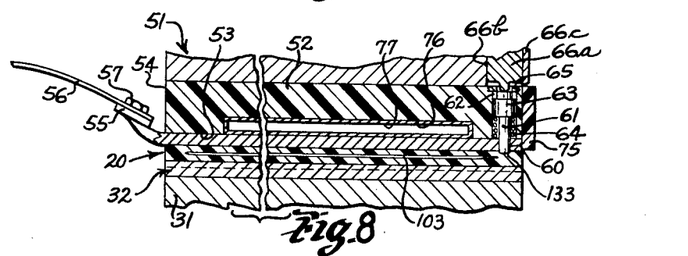
FIG. 8 is an enlarged cross-sectional view taken substantially on line 8—8 of FIG. 3.

When a temple blank 20 is placed between the electrodes 32 and 51 by means of the nest 34, described above, the electrodes must be moved into firm engaging relation with their respective opposite sides of the blank 20, as shown in FIG. 8, to produce a transfer of electrical energy into the material of the blanks. To accomplish the opening or closing of the space between the electrodes 32 and 51, the slides 29 and 30 are carried along the slideway 28 by means of a mechanism 79 in the rear of the head 27 (see FIG. 4) which is interconnected with the slides 29 and 30 by means of enlarged shaft-like arms 80 and 81 respectively which extend substantially centrally through guide slots 82 and 83 in the slideway 28 and are anchored in each of their respective slides 29 and 30. The arms 80 and 81 are interconnected by a pair of linking members 84 and 85 each pivotally connected at one end to their respective arms 80 and 81 and also pivotally connected together by a common pivot post 86. To the pivot post 86, there is also connected one end of a depending actuating arm 87 which is directly pivotally connected at 88 to the head 27. At the lower end 88a of the arm 87 the piston rod 89 of an air cylinder 90 is attached to provide means for actuating the mechanism 79. Thus, by moving the piston rod 89 in the direction of arrow 91, it can be seen that the resultant pivoting of the arm 87 about its connection 88 will, through the members 84 and 85, draw the arms 80 and 81 toward each other to move the slides 29 and 30 together and close the space between the electrodes 32 and 51 as desired. In a reverse sense, actuation of the piston rod 89 in the direction of arrow 92 will cause the slides 29 and 30 to move away from each other.

Along with the mechanism 79 and forming a part thereof, there is provided means for operating a lock member 94 (see FIGS. 3 and 4) to hold the nest 34, which carries the temple blank 20, in accurate registered relation with the electrodes 32 and 51 when the slides 29 and 30 are moved toward each other. The operating means for the lock 94 embodies a vertical slide member 95 connected to the lock 94 through linkage 96. The slide member 95 is positioned in between and guided by a pair of vertical ways 97 (see FIG. 4) and is provided with an outwardly projecting bifurcated part 98 in which one end 99 of an operating lever 100 is positioned. The lever 100 is pivotally connected at its opposite end 101 to the head 27 of the apparatus and is provided with a longitudinal slot 102 through which the above-mentioned pivot post 86 extends. Thus, when the piston rod 89 of the air cylinder 90 is moved in the direction of the arrow 91 to move the slides 29 and 30 toward each other, the arcuate movement of the pivot post 86 will lower the end 99 of the lever 100 and move the slide member 95 downwardly to close the lock 94 against the nest 34. Movement of the piston rod 89 oppositely will raise the end 99 of the lever 100 to release the lock 94 permitting the nest 34 to swing outwardly to an unloading position.

When a temple blank 20 is accurately aligned centrally between and axially parallel to the electrodes 31 and 52, and the electrodes are clamped firmly against the respective opposite sides of the blank 20, as described above with the generator 59 operating to pass high-frequency electrical energy through the material of the blank, the blank 20 will become rapidly heat-softened throughout only the area thereof between the electrode faces which contact the temple blank. Thus, a relatively narrow axial path through the temple blank will be heat-softened for the reception of a wire core which is to be thrust endwise thereinto. It has been found that for most of the above-named or other similar plastics used in the making of spectacle parts, a 1 kilowatt generator delivering electrical energy of between 90 and 100 megacycles for a time period of from 2 to 4 seconds will produce satisfactory heating results.

Figures 12, 13, 14, 15, 16, 17:
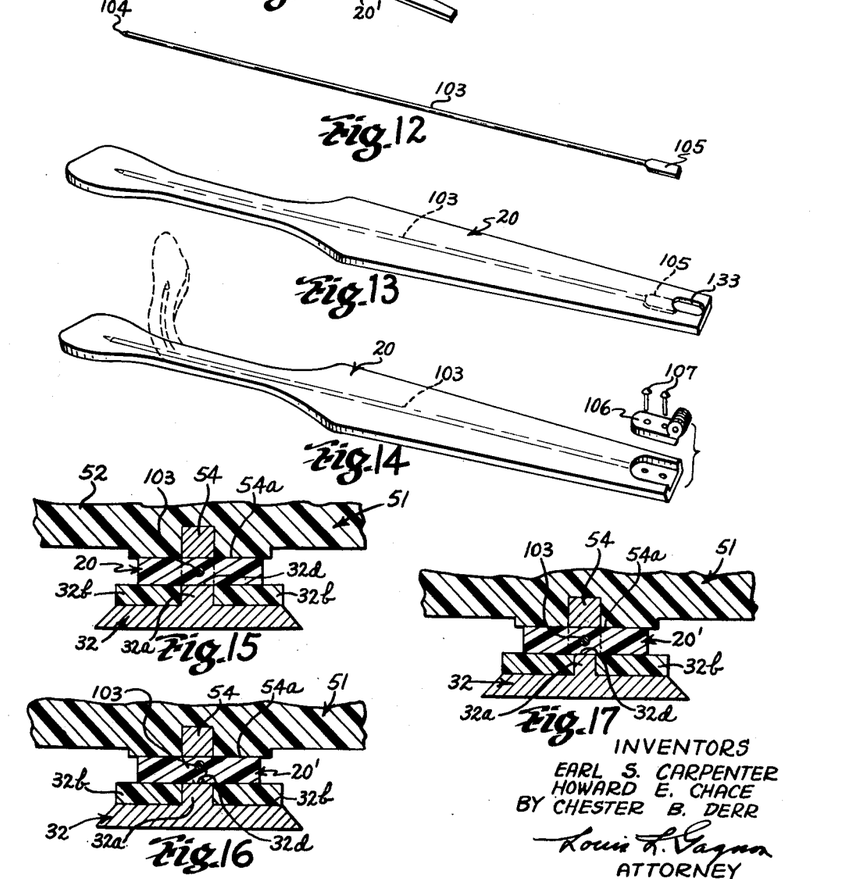
FIG. 12 is a perspective view of a conventional wire core of the type which is inserted by the apparatus of the invention into temple blanks such as shown in FIGS. 10 and 11.
FIG. 13 is a perspective view of a temple blank which has a wire core imbedded and hermetically sealed therein in accordance with the method of the invention.
FIG. 14 is a perspective view of a temple blank similar to FIG. 13 but showing diagrammatically some of the operations performed in the finishing of the temple blank subsequent to the insertion of the wire core by the method of the present invention.
FIGS. 15, 16 and 17 are diagrammatic illustrations of various dielectric heating arrangements and techniques used in the method of the invention for preparing the temple blanks of FIGS. 10 or 11 for the insertion of wire cores such as shown in FIG. 12.

The metallic wire core 103 which is to be inserted axially into the heat-softened temple blanks 20 is preferably of the type having a main straight portion shown in FIG. 12 as having a pointed end 104 and flattened opposite end 105. The flattened end 105 provides means for securely fastening a temple hinge plate or the like 106 to the finished temple (see FIG. 14). That is, in finishing a wire core temple, it is customary to recess one side of the temple (see FIG. 14) for the reception of a hinge plate 106 and to drill the temple through the flatened part 105 of the core. The hinge plate is then held in place by rivets or the like 107 extending through the hinge plate, plastic material of the temple and the flattened part 105 of the core 103.

Figure 5:
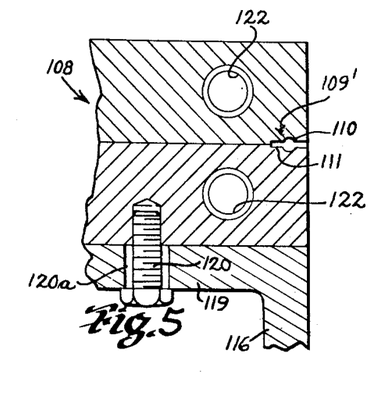
FIG. 5 is an enlarged cross-sectional view taken substantially on line 5—5 of FIG. 1.
Figure 6:
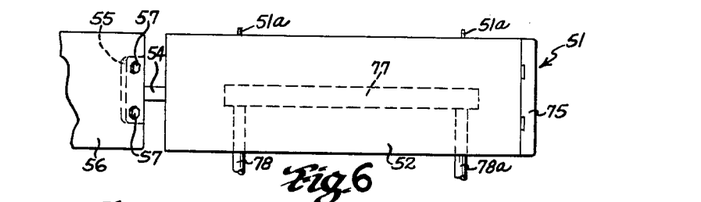
FIG. 6 is a top plan view of one electrode assembly used in a dielectric heating system which forms a part of the above apparatus.
Figure 7:
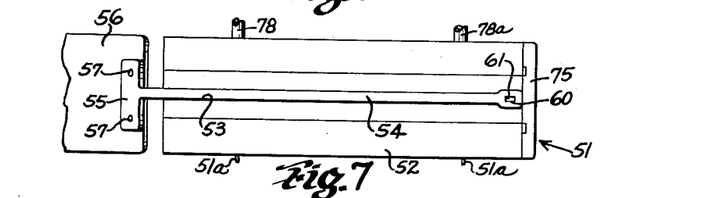
FIG. 7 is a bottom plan view of the same electrode assembly.

In order to accurately and efficiently drive the core parts 103 into the heat-softened temple blanks 20, the apparatus of FIGS. 1–9 is provided with a core-supporting and preheating box 108 which is slightly longer than the cores 103 and has a longitudinal core-receiving slot 109 extending from end-to-end along one side thereof (see FIG. 5). The slot 109 which opens outwardly at one side of the box 108 has a circular central area 110 adapted to intimately receive the elongated circular section of the main portion of the core 103 and a horizontally disposed rectangular section 111 adapted to intimately receive the flattened end 105 of the core 103. Thus, when a core 103 is pushed endwise fully into the slot 109 with its pointed end 104 directed toward the head 27, it will become keyed therein by the interfitting relationship of the flattened end 105 and the section 111 of the slot 109.

The core box 108 is mounted on the base 26 of the apparatus by means of a bracket arrangement 112 (see FIG. 1) which is adjustable both vertically and horizontally relative to the head 27 so as to permit the slot 109 to be precisely aligned axially coincident with a central axis through the temple blank 20 when said blank is clamped between the electrodes in the above-described manner for receiving the core. The bracket arrangement 112 embodies a part 113 fixed to the base 26 with screws 114 passing through slotted areas 115 which permit vertical adjustment of the part 113 when the screws 114 are loosened. A second part 116 of the bracket 112 is pivotally mounted to the part 113 at 117 and 118 and said part 116 has an upper shelf 119 to which the core box 108 is fastened by bolts 120. The second part 116 is adjustable sidewise relative to the base 26 by pivoting at 117 and 118 and is held in a desired adjusted position by screws 121. Furthermore, the core box 108 itself may be adjusted on the shelf 119 by loosening the bolts 120 which pass through enlarged slotted openings 120a in the shelf 119.

The core box 108 when properly aligned with the head 27, as just described, is placed as close as possible to the adjacent ends of the electrodes 32 and 51 so as to avoid buckling of the core 103 while passing from the core box into the material of the temple blank 20 and it is pointed out that by providing the intimate fit between the core and slot 109, the core is accurately supported and prevented from bending or rotating during its subsequent travel through the core box.

The core box 108 is provided with electrical or other suitable heating elements 122 (see FIG. 5) to heat the core prior to its insertion into the temple blank 20. After the positioning of the core 103 in the core box 108 which may be accomplished manually or by any of the various well-known core-feeding arrangements commonly used for such purposes, it is allowed to remain in the core box for a time period sufficient to become heated to approximately the temperature of the material of the temple blank.

When both the core 103 and the temple blank 20 have become properly heated, the core 103 is driven axially into the temple blank by core-driving means generally indicated by 123. The core-driving means 123 embodies a slide 124 which is mounted upon a guideway 125 at the top of the base 26. The guideway 125 is machined with precision to direct the slide 124 along a straight path parallel to the axis of the core slot 109 in the core box 108 when the core box is accurately aligned relative to the electrodes 32 and 51, as discussed above. At the forward end of the slide 124, there is provided a holder 126 in which is clamped by bolts 127 or the like an L-shaped core driver 128 which extends outwardly from the holder 126 and thence forwardly at a right angle toward the slot 109 in the core box 108. The forwardly directed portion of the core driver 128 is accurately aligned to be in coincident axial relation with the axis of the slot 109 and is of a thickness approximately equal to or slightly less than the width of the rectangular outwardly opening portion 111 of the slot 109 so as to pass freely therein. In driving a core 103 from the core box 108 into a temple blank 20, the slide 124 is moved forward toward the head 27 of the apparatus along the guideway 125 by an air cylinder 129 fixed to the base 26 and having its piston rod 130 fastened to the slide 124. The forward movement of the slide 124 causes the core driver 128 to engage a core in the box 108 and, in travelling along the slot 109, drive it into the temple blank 20 a predetermined distance governed by the extent of forward travel of the slide 124. In order to accurately set the depth to which the flattened end of the core is driven into a temple blank which depth is usually approximately one-quarter of an inch from the end of the temple facing the core box, a fixed stop 131 is provided on the head 27 and an adjustable stop 132 is provided on the slide 124. The stop 132 is so axially aligned relative to the stop 131 as to eventually engage the stop 131 when the slide 124 is moved forward toward the head 27 and thereby limiting the forward movement of the core driver 128. By adjusting the stop 132 in its mounting bracket 132a so as to place its forward end 132b closer or farther back from the forward end of the slide 124, it can be seen that the depth to which the core 103 will penetrate the temple blank 20 can be accurately controlled.

When the core driver has plunged the core 103 fully into the temple 20, it is retracted by reversing the air cylinder 129. Immediately thereafter, the core 103 is hermetically sealed in the temple blank 20 by pinching the end of the temple blank with the plunger 61, as described in detail hereinabove. The temple blank is then ejected from the apparatus, also as set forth above, and a new temple blank and wire core are placed in the nest and core box respectively to repeat the above-described operation.

Upon ejection from the apparatus, the temple blank 20 has taken on the form illustrated in FIG. 13 wherein the core is embedded centrally therein and a dimple or depression 133 remains at the location where the core is hermetically sealed. This depression 133 is, of course, removed when the temple blank is subsequently slotted for the hinge plate 196, as shown in FIG. 14 and described above.

It is pointed out, however, that the sides of the temple blanks 20 having the depressions 133 therein are always used as the inner sides of the temple, that is, the inner side being that which faces the head when the temple is in use on a spectacle frame. This leaves only the smooth untouched opposite side in view when the finished temples are in use. Because of the fact that the temples are always slotted on the side having the depression 133, the temple shown in FIGS. 13 and 14 would, obviously, be a right-hand temple when subsequently bent or shaped, as shown by the dot-dash lines in FIG. 14. That is, the temple of FIGS. 13 and 14 would be used on the right-hand side of a pair of spectacles. To make left-hand temples, the blanks 20, before receiving the cores 103, are simply placed in the nest 34 with their opposite side down. This, obviously, requires that the cut-out portion 38 of the nest 34 be reversed or turned over to accept left-hand temples.

As discussed hereinabove, one of the most difficult problems in driving wire cores into temple blanks is that of overcoming the tendency for the cores to deviate from an intended axial course centrally into the temple blanks when driven endwise. Non-uniform temperatures throughout the area of temple blanks into which the cores are driven are the major causes of bent or off-centered cores since variations in temperatures throughout the blanks cause variations in the viscosity of the material and the cores, when plunged therein, naturally, follow the path of least resistance which is the softest part of the heated temple blank.

The present invention overcomes the above difficulties by quickly and efficiently providing a uniformly heated path completely through the temple blanks into which the cores are driven. In order to accomplish this, however, it is necessary in properly designing the electrodes 32 and 51 to consider the characteristics of the material of the blanks which are to be core driven. For example, blanks 20 which have been cut from sheet stock by sawing operations or the like (see FIG. 10) generally have a substantially uniform density throughout their thickness, as described above, and, therefore, can be heated to a desired temperature uniformly throughout a preselected central area such as illustrated diagrammatically by the dotted lines in FIG. 15, with the use of electrode assemblies 32 and 51 which have electrically conducting parts 32a and 54 of substantially equal widths. That is, the exposed faces 32d and 54a of the respective parts 32a and 54 are of substantially the same area. By constructing the electrically conducting parts 32a and 54 equal in widths, as shown diagrammatically in FIG. 15, and surrounding all but the faces 32d and 54a thereof with the non-dielectric material 32b and 52, high-frequency energy which is impressed upon the part 54 will pass through the material of the blank 20 and into the grounded terminal or part 32a. In passing through the material of the blank 20 which, as stated above, is of uniform internal density throughout, the electrical current density of the electrical energy will be substantially equal at both of the faces 32d and 54a of the respective electrodes and, thus, a uniform heat will be produced within the area between the dotted lines of FIG. 15.

In dielectric heating systems, development of heat in dielectric plastic materials such as acetates, butyrates, nitrates, vinyls or the like is, according to one generally accepted theory, brought about by molecular friction. The molecules within the material are subjected to periodic stresses caused by an electric field alternating in polarity several million times a second and the amount of heat is directly proportional to the amount of high-frequency power applied to the materials. In the case of this invention, it has been found, for example, that in two to four seconds sufficient heat for core-driving without causing an overheating of the temple blanks can be developed with a 1 kilowatt generator 59 delivering a frequency of between 90 and 100 megacycles.

When the area between the dotted lines of FIG. 15 is uniformly heated, as described above, the core 103 can be driven accurately and centrally as illustrated without lateral deviation.

If, however, a temple blank 20' which has been initially formed as by a blanking operation and has a portion of its material rendered more compact or denser than another portion thereof, is heated by the equal size electrode arrangement just described, a heating effect, as diagrammatically illustrated in FIG. 16, will occur causing the core 103 to be off-axis in the blank 20' when driven thereinto. For purposes of illustration, the blank 20' has been shown in FIG. 16 as being placed between the electrodes 32 and 51 with its side of greater density facing the grounded electrode 32. Thus, when the high-frequency electrical energy is applied to the electrical conductor 54, it will pass more freely through the less dense upper section of the blank 20' thereby causing the upper section of the blank 20' to heat more readily and become hotter than the lower section and the heated zone or area between the electrodes will assume approximately the shape illustrated as being between the dotted lines in FIG. 16 wherein the upper section of the blank 20' will be heat-softened throughout a greater area than the lower section. Since a core 103 which is driven centrally into the blank 20' will naturally follow the path of least resistance, through the softest part of the blank, the core 103 will naturally deviate from an intended axial path into the blank 20' of FIG. 16 and thereby become exposed or nearly exposed along the upper side of the blank 20, as illustrated.

In overcoming this undesirable result, which is diagrammatically shown in FIG. 16, the present invention provides a method, illustrated diagrammatically in FIG. 17, for producing a uniformly heated substantially rectangularly-shaped zone or area in blanks such as 20' which have non-uniform internal densities. This is accomplished by again placing the blank 20' with its side of greater density downwardly or against the electrode 32 and by narrowing the electrode 32 as illustrated at 32a. Substantially equal electrical current densities will then be produced at both sides of the blank 20' so as to develop the substantially rectangularly-shaped heated zone or area illustrated between the dotted lines in FIG. 17. The wider face 54a of the electrical conductor 54 functions to spread the high-frequency electrical current density over a greater area at the top of the blank 20' and the narrower face 32d of the electrode 32a functions to spread the high-frequency electrical current over a narrower area. By so doing, a more concentrated heat will be produced in the more dense lower section of the blank 20' and a less concentrated heat will be produced in the less dense upper section of the blank. Therefore, by this technique, a balance can be obtained whereby both the more dense areas and the less dense areas of the blank 20' will be simultaneously heated to the same uniform temperature. It has been found that for temple blanks 20' which have been formed by blanking operations such as shown in FIG. 11, a uniformly heated substantially rectangularly-shaped zone such as diagrammatically illustrated by dotted lines in FIG. 17 can be obtained by providing the electrode 32 with a face 32d which is approximately only 65% as wide as the face 54a of the upper electrode 51. As a general rule, however, the width of the narrowest electrode should not be much less than approximately .120 of an inch since it has been found that extremely narrow electrodes in producing high concentrations of current density will tend to cause arcing through the material of the plastic being heated.

It is pointed out that the more dense side of a blank 20' should always be placed against the electrode having the narrowest face part. Therefore, in the apparatus described hereinabove, the blanks 20' must be placed with their more dense sides facing downwardly in the nest 34. In view of this fact, right and left-hand temple blanks should be punched or blanked separately with right and left-hand punches and dies to cause the more dense side of the blanks 20' to be at all times opposite to the side which is subsequently pinch-sealed at 133 by the apparatus of the invention. That is, with the electrode arrangement shown in FIG. 17 and described above, temple blanks such as 20' cannot be turned over as previously described with relation to temple blanks 20 for the making of left-hand temples from right-hand blanks since, in so doing, the more dense side of said blanks 20' would in one instance become positioned against the wider upper electrode face 54a and a non-uniform heat distribution through the blanks 20' would result. However, if it is necessary to core-drive right and left-hand temple blanks from a single batch thereof which have all been punched in the same direction and to the same contour shape, the right-hand blanks whose denser part will be at the bottom when fitted in the nest 34 may be heated and core-driven as shown in FIG. 17. For the left-handed blanks, however, which have to be turned over in order to locate the depression 133 on the proper side will cause the denser part to be facing upwardly and the related proportions of the respective electrodes, in this case, will be reversed and designed to spread the current density over a greater area at the bottom of the blanks 20' rather than at the top. Thus, the electrode face 54d would be approximately only 60% as wide as the face 32d of the lower electrode 32a.

It is pointed out that in all cases the electrode faces 32d and 54a are smoothly finished and freed of burrs and have slightly rounded corners to avoid having lead-off spots at which high-frequency electrical energy might concentrate and cause arcing between the electrodes or between one electrode and another grounded part of the apparatus.

With the apparatus of the invention properly designed as described above, the heating and core-driving of spectacle temple blanks or similar articles can be accomplished quickly, accurately and efficiently with a maximum of safety.

From the foregoing, it will be seen that an efficient and economical method has been provided for accomplishing all of the objects and advantages of the invention. Nevertheless, it is apparent that many changes in the details of construction, arrangement of parts or steps in the process may be made without departing from the spirit of the invention as expressed in the accompanying claim and the invention is not to be limited to the exact matters shown and described as only the preferred matters have been given by way of illustration.

Having described our invention, we claim:

The method of forming a spectacle temple comprising the steps of die-cutting a relatively long and narrow temple blank from a sheet of heat-softenable dielectric material of substantially uniform density, whereby the blank material will acquire properties characterized by progressively greater density from one to the other of the blank sides which originally formed surfaces of said sheet material, disposing the temple blank within a nest of a non-dielectric material for confining the die-cut edges thereof, directing high frequency electrical energy between said blank sides through a narrow section extending longitudinally from one end of the blank throughout a major portion of the length thereof for uniformly heat-softening said material throughout said section, said high frequency energy being directed through respective areas of said blank sides which are selected in accordance with the density characteristics of said dielectric material for distributing said energy through said section with an energy density which is substantially inversely proportional to the material density in various parts of said section, said selected area of said one blank side being relatively larger than said selected area of said other blank side, enclosing the remaining areas of said blank sides with members of non-dielectric material for confining the blank and for shielding said remaining areas from said energy, heating a relatively long and slender metallic reinforcing core to the approximate temperature of said blank section, and driving said core longitudinally into said heat-softened blank section from said one end.

References Cited in the file of this patent

UNITED STATES PATENTS

| | | |
|---|---|---|
| 1,825,427 | Sidall | Sept. 29, 1931 |
| 2,415,025 | Grell et al. | Jan. 28, 1947 |
| 2,529,863 | Bowen | Nov. 14, 1950 |
| 2,617,752 | Von Hauterville | Nov. 11, 1952 |

FOREIGN PATENTS

| | | |
|---|---|---|
| 1,015,594 | Germany | Sept. 12, 1957 |